United States Patent
Chen et al.

(10) Patent No.: US 12,153,470 B2
(45) Date of Patent: Nov. 26, 2024

(54) BENDABLE TELEVISION

(71) Applicant: Shenzhen Skyworth-RGB Electronics Co., Ltd., Guangdong (CN)

(72) Inventors: Weixiong Chen, Guangdong (CN); Lingchao Hu, Guangdong (CN); Yunian Wang, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 79 days.

(21) Appl. No.: 17/793,865

(22) PCT Filed: Dec. 21, 2020

(86) PCT No.: PCT/CN2020/137866
§ 371 (c)(1),
(2) Date: Jul. 19, 2022

(87) PCT Pub. No.: WO2021/253776
PCT Pub. Date: Dec. 23, 2021

(65) Prior Publication Data
US 2023/0098363 A1    Mar. 30, 2023

(30) Foreign Application Priority Data
Jun. 17, 2020 (CN) ......................... 202010554121.6

(51) Int. Cl.
*G06F 1/16* (2006.01)
*G09F 9/30* (2006.01)
*H04N 5/655* (2006.01)

(52) U.S. Cl.
CPC .......... *G06F 1/1652* (2013.01); *G06F 1/1601* (2013.01); *G09F 9/301* (2013.01); *H04N 5/655* (2013.01)

(58) Field of Classification Search
None
See application file for complete search history.

(56) References Cited

U.S. PATENT DOCUMENTS

| | | | |
|---|---|---|---|
| 11,758,671 B2 * | 9/2023 | Kim ...................... | G06F 1/1652 361/807 |
| 2005/0081711 A1 * | 4/2005 | Kerekes ................ | F15B 15/103 92/48 |

(Continued)

FOREIGN PATENT DOCUMENTS

| CN | 104464529 A | 3/2015 |
|---|---|---|
| CN | 104867406 A | 8/2015 |

(Continued)

OTHER PUBLICATIONS

International Search Report, mailed on Mar. 22, 2021, from PCT/CN2020/137866, International Filing Date Dec. 21, 2021, 6 pages.

(Continued)

*Primary Examiner* — Anthony Q Edwards
*Assistant Examiner* — Rashen E Morrison
(74) *Attorney, Agent, or Firm* — Samson G. Yu

(57) ABSTRACT

A bendable television includes a television body, an airbag, and an inflation and deflation mechanism. The television body has a flat state and a curved state. The airbag is bonded to a rear sidewall of the television body, and one side of the airbag away from the television body is provided with a deformation slot extending along a width direction of the airbag. The inflation and deflation mechanism is connected to the airbag, and is configured to inflate the airbag or draw gas out of the airbag. The television body is configured to change from the flat state to the curved state when the inflation and deflation mechanism inflates the airbag.

20 Claims, 2 Drawing Sheets

(56) References Cited

U.S. PATENT DOCUMENTS

| | | | | |
|---|---|---|---|---|
| 2008/0018631 | A1* | 1/2008 | Hioki | G02F 1/133526 345/206 |
| 2018/0116061 | A1* | 4/2018 | Xu | H05K 5/0017 |
| 2023/0232550 | A1* | 7/2023 | Hu | G09F 9/301 |

FOREIGN PATENT DOCUMENTS

| CN | 105118401 A | 12/2015 |
|---|---|---|
| CN | 105405363 A | 3/2016 |
| CN | 205084551 U | 3/2016 |
| CN | 106442164 A | 2/2017 |
| CN | 108076180 | 5/2018 |
| CN | 108076180 A | 5/2018 |
| CN | 207409209 U | 5/2018 |
| CN | 108269496 A | 7/2018 |
| CN | 108417152 A | 8/2018 |
| CN | 109674129 A | 4/2019 |
| CN | 208737806 U | 4/2019 |
| CN | 109806101 A | 5/2019 |
| CN | 111706752 A | 9/2020 |

OTHER PUBLICATIONS

First Office Action from Chinese Patent Application No. 202010554121.6.
Second Office Action from Chinese Patent Application No. 202010554121.6.
First Search Report of Chinese Patent Application No. 202010554121.6.
Supplementary Search of Chinese Patent Application No. 202010554121.6.
Office Action dated Mar. 1, 2023 from corresponding Indian Application No. 202227063658.

* cited by examiner

BENDABLE TELEVISION

CROSS-REFERENCE TO RELATED APPLICATION(S)

This is a national stage application filed under 37 U.S.C. 371 based on International Patent Application No. PCT/CN2020/137866, filed Dec. 21, 2020, which claims the priority of Chinese patent application No. 202010554121.6 filed on Jun. 17, 2020 to the CNIPA, which are incorporated in the present disclosure by reference in its entirety.

TECHNICAL FIELD

The present application relates to the technical field of televisions, for example, to a bendable television.

BACKGROUND

In the related art, a flat television cannot give people the best view but is suitable for many people to watch, while a curved television is not suitable for many people to watch, but its central position has the best visual effect. The television in the related art cannot be compatible with the flat state and the curved state at the same time, and cannot better satisfy people's use requirements.

SUMMARY

The present application provides a bendable television. Such television can be compatible with a flat state and a curved state, and can better satisfy people's use requirements.

The present application discloses a bendable television. The bendable television includes a television body, an airbag, and an inflation and deflation mechanism. The television body has a flat state and a curved state. The airbag is connected to a rear sidewall of the television body, and one side of the airbag away from the television body is provided with a deformation slot extending along a width direction of the airbag. The inflation and deflation mechanism is connected to the airbag, and is configured to inflate the airbag or draw gas out of the airbag. The television body is configured to change from the flat state to the curved state when the inflating and deflating mechanism inflates the airbag.

Figure 1:
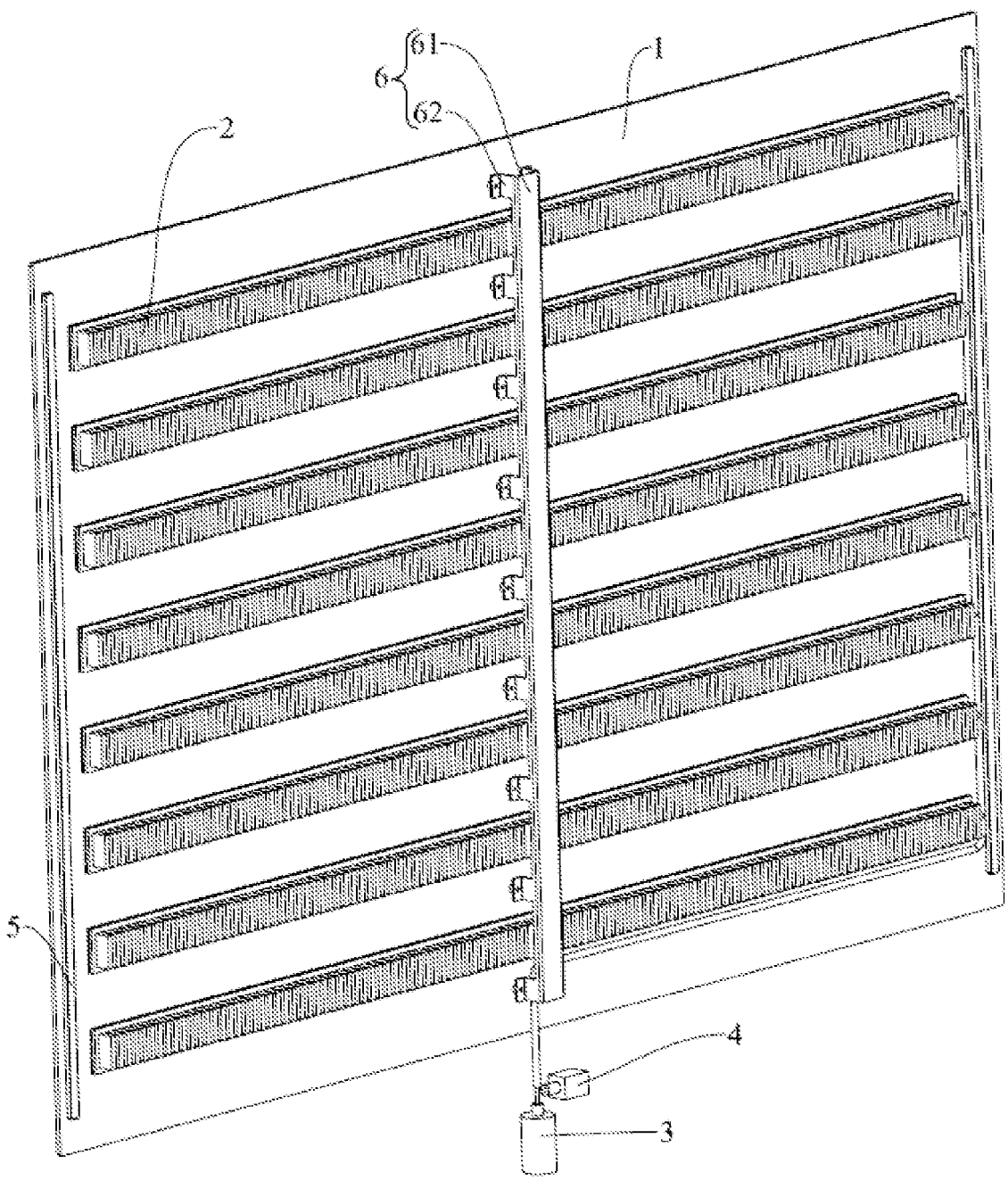
FIG. 1 is a structure diagram of a bendable television according to an embodiment of the present application.

REFERENCE LIST 1 television body;
2 airbag
21 lower cover
22 upper cover
221 plane plate portion
222 protrusion portion
2221 top plate
2222 side plate
22221 long plate
22222 short plate
22223 inclined plate
3 inflation and deflation mechanism
4 air pressure detection mechanism
5 side reinforcement strip
6 middle reinforcement strip
61 reinforcement piece
62 connection pin

DETAILED DESCRIPTION

The solutions of the present application are further described below through embodiments in conjunction with drawings.

In the description of the present application, it is to be understood that the orientation or position relationships indicated by terms "center", "longitudinal", "lateral", "length", "width", "thickness", "above", "below", "front", "back", "left", "right", "vertical", "horizontal", "top", "bottom", "inside", "outside", "clockwise", "counterclockwise", "axial", "radial", "circumferential", etc. are based on the orientation or position relationships shown in the drawings, merely for facilitating description of the present application and simplifying description, and do not indicate or imply that the apparatus or element referred to has a specific orientation and is constructed and operated in a specific orientation.

In addition, a feature defined as a "first" feature or a "second" feature may explicitly or implicitly include one or more of such features to distinguish and describe features regardless of order or weight. In the description of the present application, unless otherwise noted, the term "a plurality of" or "multiple" means two or more.

In the description of the present application, it is to be noted that unless otherwise expressly specified and limited, the term "mounted", "connected to each other", or "connected" is to be construed in a broad sense as securely connected, detachably connected, or integrated; mechanically connected or electrically connected; directly connected to each other or indirectly connected to each other via an intermediary; or intraconnected between two components. For those of ordinary skill in the art, meanings of the preceding terms in the present application may be understood based on situations.

The structure of a bendable television of an embodiment of the present application is described below with referring to FIGS. 1 to 2.

Figure 2:
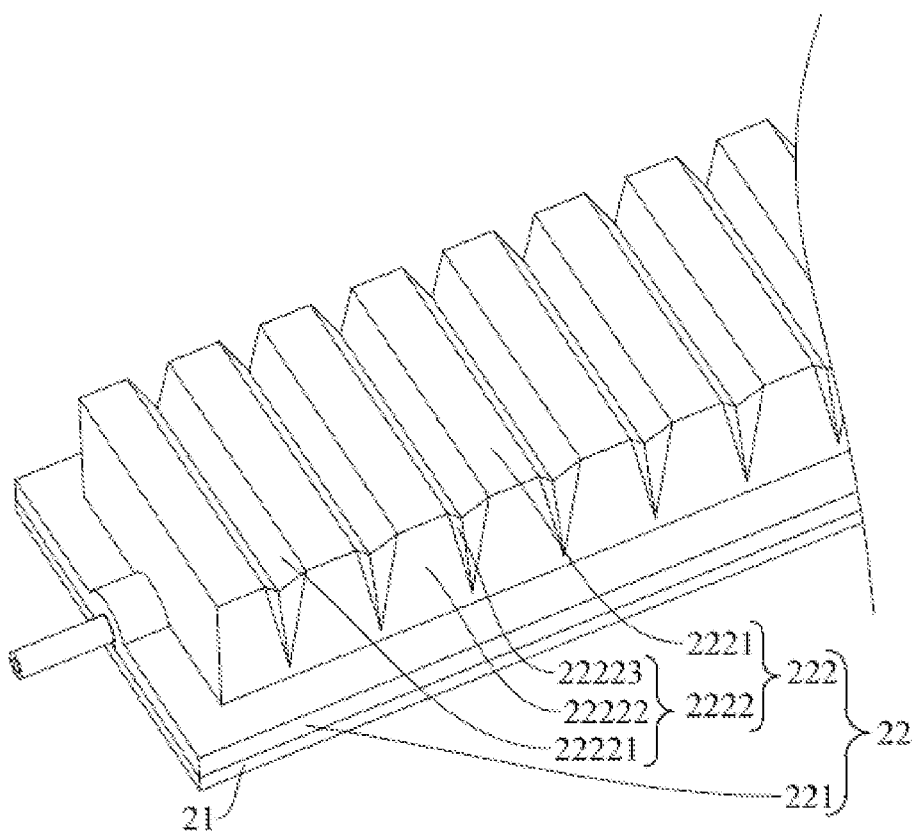
FIG. 2 is a partial structure diagram of an airbag according to an embodiment of the present application.

As shown in FIGS. 1 to 2, an embodiment of the present application discloses a bendable television. The bendable television includes a television body 1, an airbag 2, and an inflation and deflation mechanism 3. The television body 1 has a flat state and a curved state. The airbag 2 is bonded to a rear sidewall of the television body 1, and one side of the airbag 2 away from the television body 1 is provided with a deformation slot extending along a width direction of the airbag 2. The inflation and deflation mechanism 3 is connected to the airbag 2, and is configured to inflate the airbag 2 or draw gas out of the airbag 2. The television body 1 is configured to change from the flat state to the curved state when the inflation and deflation mechanism 3 inflates the airbag 2.

The television body 1 in this embodiment may be an OLED screen or an LED screen, and the type of the television body 1 may be selected according to the actual situation.

It is to be understood that in a case where the airbag 2 is in a shriveled state, the television body 1 is in the flat state, and in this state, it is convenient for multiple people to watch at the same time; and when the number of viewers is relatively small, in order to improve user's visual experience, the inflation and deflation mechanism 3 inflates the airbag 2, since one side of the airbag 2 is bonded to the rear sidewall of the television body 1, one side of the airbag 2 away from the rear sidewall of the television body 1 is provided with a deformation slot. When the airbag 2 is inflated, one end of the airbag 2 bonded to the rear sidewall of the television body 1 does not change, and one end away from the television body 1 expands so that the whole airbag 2 bends, and the bending of the airbag 2 may also drive the television body 1 to bend. That is, the television body 1 may change from the flat state to the curved state so as to have a better visual effect when the inflation and deflation mechanism 3 inflates the airbag 2.

In the bendable television of the present application, as the rear sidewall of the television body 1 is provided with the airbag 2, one side of the airbag 2 is connected to the television body 1, and one side of the airbag 2 away from the television body 1 is provided with the deformation slot, when the airbag 2 is inflated, a corresponding part of the deformation slot expands so as to drive the whole airbag 2 to bend, so that the television body 1 bends, thereby enabling the bendable television to switch between the flat state and the curved state, and better satisfying the user's requirements.

In some embodiments, multiple airbags 2 are provided, and the multiple airbags 2 are spaced apart along a width direction of the television body 1. It can be understood that if the airbag 2 is one tiled on a rear side of the television body 1, the airbag is not only easy to be damaged, but also deforms slowly during the inflation process, so that the bending speed of the television body 1 is relatively slow, which is unfavorable for the user to switch the state of the television body 1. In this embodiment, multiple airbags 2 are spaced apart along the width direction of the television body 1. On the one hand, the damage probability of the airbag 2 is reduced, and the use reliability of the bendable battery is improved; and on the other hand, the multiple airbags 2 are provided, each airbag 2 has a relatively small width, and the inflation and deformation speed is fast, so that the television body 1 can be switched from the flat state to the curved state at a relatively fast speed, thereby better satisfying the user's requirements.

In this embodiment, the number and the arrangement of the airbags 2 can be determined according to the size and shape of the television body 1.

In some embodiments, multiple deformation slots are provided, and the multiple deformation slots are spaced apart along a longitudinal direction of the airbag 2. It can be understood that the deformation grooves spaced apart along the longitudinal direction of the airbag 2 can enable the entire airbag 2 to be formed into a relatively smooth arc after the airbag 2 is expanded, so that the television body 1 is formed into a relatively smooth plane, better satisfying the user's visual requirements.

It should be noted that the deformation grooves may be uniformly spaced apart or non-uniformly spaced apart according to the actual requirements, or may be partially uniformly spaced apart or partially non-uniformly spaced apart, or may be completely non-uniformly spaced apart.

In some embodiments, the airbag 2 includes a lower cover 21 and an upper cover 22. The lower cover 21 is bonded to a rear sidewall of the television body 1, and the upper cover 22 includes a plane plate portion 221 and multiple protrusion portions 222 connected to the plane plate portion 221. The multiple protrusion portions 222 are spaced apart, and the deformation slot is formed between two adjacent protrusion portions 222. It can be understood that the plane plate portion 221 of the upper cover 22 can be better connected to the lower cover 21, thereby avoiding the occurrence of air leakage of the airbag 2 caused by unstable connection between the upper cover 22 and the lower cover 21. The multiple protrusion portions 222 on the upper cover 22 ensure that two adjacent protrusion portions 222 collide in a direction facing away from each other after the airbag 2 is expanded, ensuring the stable bending of the airbag 2, thereby ensuring that the television body 1 can be switched from the flat state to the curved state.

In one embodiment, to ensure the sealing performance of the airbag 2, the upper cover 22 and the lower cover 21 are bonded by a sealant to avoid the occurrence of the air leakage failure of the airbag 2 during use.

In some embodiments, the protrusion portion 222 includes a top plate 2221 and multiple side plates 2222. The top plate 2221 and the plane plate portion 221 are spaced apart; and the multiple side plates 2222 are disposed around the top plate 2221 and is connected to the plane plate portion 221. The thickness of the top plate 2221 is greater than the thickness of the side plate 2222. It can be understood that the side plate 2222 has a relatively small thickness and the top plate 2221 has a relatively large thickness so that the protrusion portion 222 is easy to expand along the longitudinal direction of the airbag 2 during the inflation process of the airbag 2, so that the bending degree of the airbag 2 is relatively large, thereby ensuring a relatively large curvature of the television body 1 in the curved state, and satisfying the user's requirements of the curved screen.

In some embodiments, the side plates 2222 include two long plates 22221 spaced apart in a longitudinal direction of the flat plate portion 221, and two short plates 22222 spaced apart in a width direction of the flat plate portion 221, and each side of two opposite sides of each short plate of the two short plates 22222 is provided with an inclined plate 22223 arranged obliquely towards each long plate 22221. It can be understood that the existence of the inclined plate 22223 can alleviate the squeezing between the two adjacent side plates 2222 after the inflation of the airbag 2 is completed, and preferably avoid the interaction between the two adjacent protrusion portions 222. The inclination angle of the inclined plate 22223 can be selected according to actual needs.

In some embodiments, each airbag 2 is connected to the inflation and deflation mechanism 3 through a pipe, and the bendable television further includes an air pressure detection mechanism 4. The air pressure detection mechanism 4 is connected to the pipe, and is configured to detect the air pressure in at least one of the pipe and the plurality of airbags 2.

It can be understood that different air pressures in the airbag 2 and the pipe correspond to different bending radians. In this embodiment, the inflation degree of the airbag 2 can be adjusted according to the detection result of the air pressure detection mechanism, thereby controlling the radian of the television body 1 to satisfy the requirements of different users for the radian of the television body 1. At the same time, when the air pressure in the airbag and the pipe is detected to be insufficient, the inflation and deflation mechanism 3 can replenish air in time to ensure the television body 1 to be in the curved state.

In some embodiments, the air pressure detection mechanism 4 includes multiple air pressure detection pieces, and the multiple air pressure detection pieces are disposed in one-to-one correspondence with the multiple airbags 2. Therefore, the multiple air pressure detection pieces can measure the air pressures in the multiple airbags 2 so that the air pressures in the multiple airbags 2 are approximately equal, thereby avoiding defects such as protrusions or slots in the curved surface of the television body 1 caused by different air pressures in the multiple airbags 2 when the television body 1 is in the curved state.

In some embodiments, the bendable television further includes a side reinforcement strip 5. The side reinforcement strip 5 is connected to the television body. Side reinforcement strips 5 are located at two ends of the airbag 2. It can be understood that, in the curved state, parts of the bendable television located at both sides of the airbag 2 are basically unchanged, and the side reinforcement strips 5 arranged at the two ends of the airbag 2 can improve the strength of the television body 1, thereby avoiding the occurrence of the phenomenon that the television body 1 is easily deformed by the external force.

In some embodiments, the bendable television also includes a middle reinforcement strip 6. The middle reinforcement strip 6 is connected to the television body 1, and includes a reinforcement piece 61 and a connection pin 62. The reinforcement piece 61 extends along a width direction of the television body 1, and the airbag 2 is located between the reinforcement piece 61 and the rear sidewall of the television body 1. A first end of the connection pin 62 is connected to the reinforcement piece 61, and a second end of the connection pin 62 is connected to the rear sidewall of the television body 1. It can be understood that the added middle reinforcement strip 6 can improve the rigidity of the television body 1 and avoid the occurrence of the phenomenon that the television body 1 is easily to be deformed by the external force.

EMBODIMENT

As shown in FIGS. 1 to 2, the bendable television of the present embodiment includes a television body 1, an airbag 2 and an inflation and deflation mechanism 3. The television body 1 has a flat state and a curved state. There are eight airbags 2, and each airbag 2 extends along a longitudinal direction of the television body 1. The airbag 2 includes a lower cover 21 and an upper cover 22. The lower cover 21 is bonded to a rear sidewall of the television body 1, and the upper cover 22 includes a plane plate portion 221 and multiple protrusion portions 221 connected to the plane plate portion 221. The multiple protrusion portions 222 are spaced apart, and the deformation slot is formed between two adjacent protrusion portions 222. The projection 222 includes a top plate 2221 and four side plates 2222. The side plates 2222 are disposed between the top plate 2221 and the plane plate portion 221 which are spaced apart; and the multiple side plates 2222 are disposed around the top plate 2221 and is connected to the plane plate portion 221. The thickness of the top plate 2221 is greater than the thickness of the side plate 2222. The four side plates 2222 include two long plates 22221 spaced apart in a longitudinal direction of the flat plate portion 221 and two short plates 22222 spaced apart in a width direction of the flat plate portion 221, and each side of two opposite sides of each short plate of the two short plates 22222 is provided with an inclined plate 22223 arranged obliquely towards each long plate 22221.

The inflation and deflation mechanism 3 is connected to the airbag 2 through a pipe, an air pressure detection mechanism 4 is disposed at an air outlet of the inflation and deflation mechanism 3, and the inflation and deflation mechanism 3 is configured to inflate the air bag 2 or draw air out of the airbag 2. The television body 1 is configured to change from the flat state to the curved state when the inflation and deflation mechanism 3 inflates the airbag 2. Two side reinforcement strips 5 are connected to the television body 1, and the two side reinforcement strips 5 are located at two ends of the airbag 2. The middle reinforcement strip 6 is connected to the television body 1, and includes a reinforcement piece 61 and a connection pin 62. The reinforcement piece 61 extends along a width direction of the television body 1, and the airbag 2 is located between the reinforcement piece 61 and the rear sidewall of the television body 1. A first end of the connection pin 62 is connected to the reinforcement piece 61, and a second end of the connection pin is connected to the rear sidewall of the television body 1.

In the description of the specification, the description of reference terms such as "some embodiments" and "other embodiments" is intended to mean that features, structures, materials, or characteristics described in conjunction with such embodiments or examples are included in at least one embodiment or example of the present application. In the specification, the illustrative description of the preceding terms does not necessarily refer to the same embodiment or example. Moreover, the described features, structures, materials or characteristics may be combined in an appropriate manner in any one or more embodiments or examples.

In the bendable television of the present application, as the rear sidewall of the television body is provided with the airbag, one side of the airbag is connected to the television body, and one side of the airbag away from the television body is provided with the deformation slot, when the airbag is inflated, a corresponding part of the deformation slot expands so as to drive the whole airbag to bend, so that the television body bends, thereby enabling the bendable television to switch between the plat state and the curved state, and better satisfying the user's requirements.

What is claimed is:

1. A bendable television, comprising:
a television body, wherein the television body has a flat state and a curved state;
an airbag, wherein the airbag is connected to a rear sidewall of the television body, and one side of the airbag away from the television body is provided with a deformation slot extending along a width direction of the airbag; and
an inflation and deflation mechanism, wherein the inflation and deflation mechanism is connected to the airbag, and is configured to inflate the airbag or draw gas out of the airbag,
wherein the television body is configured to change from the flat state to the curved state when the inflation and deflation mechanism inflates the airbag;
wherein a plurality of deformation slots are provided, and the plurality of deformation slots are spaced apart along a longitudinal direction of the airbag;
wherein the airbag comprises:
a lower cover, wherein the lower cover is bonded to the rear sidewall of the television body; and
an upper cover, wherein the upper cover comprises a plane plate portion, and a plurality of protrusion portions connected to the plane plate portion, the plurality of protrusion portions are spaced apart, and one of the plurality of deformation slots is formed between two adjacent protrusion portions of the plurality of protrusion portions.

2. The bendable television of claim 1, wherein a plurality of airbags are provided, and the plurality of airbags are spaced apart along a width direction of the television body.

3. The bendable television of claim 1, wherein each protrusion portion of the plurality of protrusion portions comprises:
  a top plate, wherein the top plate and the plane plate portion are spaced apart; and
  a plurality of side plates, wherein the plurality of side plates are disposed around the top plate and are connected to the plane plate portion.

4. The bendable television of claim 3, wherein a thickness of the top plate is greater than a thickness of each of the plurality of side plates.

5. The bendable television of claim 3, wherein the plurality of side plates comprise two long plates spaced apart in a longitudinal direction of the plane plate portion, and two short plates spaced apart in a width direction of the plane plate portion, and each side of two opposite sides of each short plate of the two short plates is provided with an inclined plate arranged obliquely towards each of the two long plates.

6. The bendable television of claim 1, wherein the plurality of deformation slots are uniformly spaced apart.

7. The bendable television of claim 1, wherein a plurality of airbags are provided, and an air pressure in each airbag of the plurality of airbags is equal when the television body is in the curved state.

8. The bendable television of claim 2, wherein each airbag of the plurality of airbags is connected to the inflation and deflation mechanism through a pipe, and the bendable television further comprises an air pressure detection mechanism, wherein the air pressure detection mechanism is connected to the pipe, and is configured to detect an air pressure in at least one of the pipe and the plurality of airbags.

9. The bendable television of claim 8, wherein the air pressure detection mechanism comprises a plurality of air pressure detection pieces, and the plurality of air pressure detection pieces are disposed in one-to-one correspondence with the plurality of airbags.

10. The bendable television of claim 1, further comprising a side reinforcement strip, wherein the side reinforcement strip is connected to the television body.

11. The bendable television of claim 10, wherein two side reinforcement strips are provided, and the two side reinforcement strips are located at two ends of the airbag.

12. The bendable television of claim 1, further comprising a middle reinforcement strip, wherein the middle reinforcement strip is connected to the television body, and comprises:
  a reinforcement piece, wherein the reinforcement piece extends along a width direction of the television body, and the airbag is located between the reinforcement piece, and the rear sidewall of the television body; and
  a connection pin, wherein a first end of the connection pin is connected to the reinforcement piece, and a second end of the connection pin is connected to the rear sidewall of the television body.

13. The bendable television of claim 1, further comprising: an air pressure detection mechanism, wherein the air pressure detection mechanism is configured to detect an air pressure of the airbag.

14. The bendable television of claim 4, wherein the plurality of side plates comprise two long plates spaced apart in a longitudinal direction of the plane plate portion, and two short plates spaced apart in a width direction of the plane plate portion, and each side of two opposite sides of each short plate of the two short plates is provided with an inclined plate arranged obliquely towards each of the two long plates.

15. A bendable television, comprising:
  a television body, wherein the television body has a flat state and a curved state;
  an airbag, wherein the airbag is connected to a rear sidewall of the television body, and one side of the airbag away from the television body is provided with a deformation slot extending along a width direction of the airbag; and
  an inflation and deflation mechanism, wherein the inflation and deflation mechanism is connected to the airbag, and is configured to inflate the airbag or draw gas out of the airbag,
  wherein the television body is configured to change from the flat state to the curved state when the inflation and deflation mechanism inflates the airbag;
  the bendable television further comprises a middle reinforcement strip, wherein the middle reinforcement strip is connected to the television body, and comprises:
  a reinforcement piece, wherein the reinforcement piece extends along a width direction of the television body, and the airbag is located between the reinforcement piece, and the rear sidewall of the television body; and
  a connection pin, wherein a first end of the connection pin is connected to the reinforcement piece, and a second end of the connection pin is connected to the rear sidewall of the television body.

16. The bendable television of claim 15, wherein a plurality of airbags are provided, and the plurality of airbags are spaced apart along the width direction of the television body.

17. The bendable television of claim 16, wherein each airbag of the plurality of airbags is connected to the inflation and deflation mechanism through a pipe, and the bendable television further comprises an air pressure detection mechanism, wherein the air pressure detection mechanism is connected to the pipe, and is configured to detect an air pressure in at least one of the pipe and the plurality of airbags.

18. The bendable television of claim 17, wherein the air pressure detection mechanism comprises a plurality of air pressure detection pieces, and the plurality of air pressure detection pieces are disposed in one-to-one correspondence with the plurality of airbags.

19. The bendable television of claim 15, further comprising a side reinforcement strip,
  wherein the side reinforcement strip is connected to the television body;
  wherein two side reinforcement strips are provided, and the two side reinforcement strips are located at two ends of the airbag.

20. The bendable television of claim 15, further comprising: an air pressure detection mechanism, wherein the air pressure detection mechanism is configured to detect an air pressure of the airbag.

* * * * *